(12) United States Patent
Fukuda

(10) Patent No.: US 6,490,108 B1
(45) Date of Patent: Dec. 3, 2002

(54) DIGITAL DATA RECORDING METHOD AND APPARATUS, DIGITAL DATA REPRODUCING APPARATUS, AND MAGNETIC TAPE THEREFOR

(75) Inventor: Shinichi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/326,570

(22) Filed: Jun. 7, 1999

(30) Foreign Application Priority Data

Jun. 9, 1998 (JP) .......................................... 10-161085

(51) Int. Cl.$^7$ ................................................ G11B 5/09
(52) U.S. Cl. ................................ 360/48; 360/51
(58) Field of Search ...................... 360/48, 51

(56) References Cited

U.S. PATENT DOCUMENTS

| | | | | |
|---|---|---|---|---|
| 5,036,408 A | * | 7/1991 | Leis et al. | 360/48 |
| 5,210,660 A | * | 5/1993 | Hetzler | 360/51 |
| 5,481,412 A | * | 1/1996 | Bannai et al. | 360/18 |
| 5,850,315 A | * | 12/1998 | Kondo | 360/48 |

* cited by examiner

Primary Examiner—Regina N. Holder
(74) Attorney, Agent, or Firm—Jay H. Maioli

(57) ABSTRACT

A digital data recording method records, on a magnetic tape, digital data formed of a plurality of data blocks. Each data block has a constant or variable length and includes control data including at least a synchronizing signal and address information, and the digital data recording method records the control data at a position excluding the opposite ends of each data block.

5 Claims, 5 Drawing Sheets

DIGITAL DATA RECORDING METHOD AND APPARATUS, DIGITAL DATA REPRODUCING APPARATUS, AND MAGNETIC TAPE THEREFOR

BACKGROUND OF THE INVENTION

1. Field of the Invention

The present invention relates to a digital data recording method and apparatus that separates digital data in units of constant or variable lengths, and records the separated digital data as a plurality of data blocks on a magnetic tape, a reproducing apparatus for reproducing the recorded digital data, and the magnetic tape on which the digital data are recorded.

2. Description of the Related Art

A conventional helical-scanning recording-and-reproducing system is known that uses a rotary head to form recording tracks inclined to the feeding direction of a magnetic tape as a recording medium so that digital data such as audio data and video data are recorded or reproduced.

In the helical-scanning recording-and-reproducing system, the digital data recorded on the magnetic tape are normally separated in units of predetermined length, and control data including at least a synchronizing signal and address information are added to each separated digital data unit, whereby a plurality of data blocks is formed. The digital data are processed using one data block as the minimum data unit.

The control data added to each data block is called a "header", and is normally positioned at the head of each data block. The digital data are reproduced by initially reading the control data at the head of each data block, recognizing, based on the read control data, the head and position of each data block, reading data such as audio data and video data, and performing post-stage signal processing based on the control data so that the read data are recomposed to generate reproduced data.

Recently, a so-called "non-tracking reproducing method" has been proposed as a type of the above-described digital data reproduction. The non-tracking reproducing method recomposes correctly read data by using a reproducing magnetic head to perform scanning at a speed double that of the relative movement of the magnetic head and the magnetic tape in the recording mode, whereby the need for controlling the reproducing magnetic head to precisely trace recording tracks is eliminated.

In the non-tracking reproducing method, the reproducing magnetic head may fail to precisely trace the recording tracks, and may scan more than one recording track at the same time by skewing across them. This causes the order of data blocks in the recording mode to differ from an order of data blocks in the reproduction mode. Accordingly, in the non-tracking reproducing method, data that were correctly read by scanning using the reproducing magnetic head are temporarily stored in a memory, and data are recomposed for reproduction by rearranging the stored data in the recording order, based on control data.

In the non-tracking reproducing method, only data blocks having acceptable error rates are stored in the memory as data blocks based on which recomposition is performed, and data blocks having inferior error rates are not stored in the memory.

In the non-tracking reproducing method, the error rate of the read data varies in accordance with the distance at which the reproducing magnetic head is positioned on the recording tracks at the recording position of the read data. The reproducing magnetic head scans the recording tracks by skewing. Thus, data constituting one single data block may include acceptable error rates and inferior error rates. The single data block has the greatest difference in error rates in the head and end thereof.

In the non-tracking reproducing method, the error rates of the read data block are evaluated based on the error rate of the control data at the head of each data block. Thus, in the case where the error rate of the. control data is inferior, the error rates of the entire data block are regarded as inferior, even when the end portion of the data block has an acceptable error rate. This may prevent the entire data block from being stored in the memory. Conversely, in the case where the error rate of the control data is acceptable, the error rate of the entire data block is regarded as acceptable, even when the end portion of the data block has an inferior rate. Thus, data having an inferior error rate may be stored in the memory.

Therefore, the non-tracking reproducing method has a problem in that the data utilizing efficiency deteriorates and the reliability of the reproduced data may be reduced.

SUMMARY OF THE INVENTION

Accordingly, it is an object of the present invention to provide a digital data recording method and apparatus for suppressing a decrease in data utilizing efficiency and for obtaining highly reliable reproduced data, a reproducing apparatus for reproducing highly reliable digital data while suppressing a decrease in data utilizing efficiency, and a magnetic tape on which digital data for suppressing a decrease in data utilizing efficiency and for improving the reliability of reproduced data are recorded.

To this end, according to an aspect of the present invention, the foregoing object is achieved through provision of a digital data recording method for recording, on a magnetic tape, digital data comprised of a plurality of data blocks. Each data block has a known length and includes control data including at least a synchronizing signal and address information, and the digital data recording method records the control data at a position excluding the opposite ends of each data block.

According to another aspect of the present invention, the foregoing object is achieved through provision of a recording apparatus including a data writer for recording digital data on a magnetic tape by using a recording head and the magnetic tape so that the recording head and the magnetic tape are moved with respect to each other, and a data supplier for supplying the data writer with the digital data as a plurality of data blocks separated into units having known lengths. The data blocks each include control data including at least a synchronizing signal and address information, and the control data is recorded at a position excluding the opposite ends of each data block.

According to a further aspect of the present invention, the foregoing object is achieved through provision of a reproducing apparatus including a data reader for causing a reproducing magnetic head to scan a magnetic tape so that digital data recorded on the magnetic tape are read, and a signal processor for generating reproduced data by implementing signal processing for the digital data read by the data reader. The digital data read by the data reader are recorded on the magnetic tape as a plurality of data blocks which are separated into units having known lengths. The data blocks each include control data including at least a synchronizing signal and address information, and the control data is recorded at a position excluding the opposite ends,of each data block.

Preferably, the signal processor generates the reproduced data by temporarily storing the digital data read by the data reader, and recomposing the digital data based on the address information of each data block.

According to yet another aspect of the present invention, the foregoing object is achieved through provision of a magnetic tape on which digital data as a plurality of data blocks separated into units having known lengths are recorded for recording tracks inclined with respect to the direction of scanning. The data blocks each include control data including at least a synchronizing signal and address information, and the control data is recorded at a position excluding the opposite ends of each data block.

According to the present invention, control data based on which error rates of each data block is evaluated is added to a position of the data block excluding the opposite ends of the data block. Therefore, even in the case where the error rate of data at the head of the data block differs from the error rate of data at the end of the data block, almost the average of error rates of data in the data block is evaluated such that a reproducing magnetic head scans recording tracks by skewing.

Therefore, by using the present invention to record digital data, the data utilizing efficiency in reproduction of the digital data can be increased, and the reliability of reproduced data can be improved.

DESCRIPTION OF THE PREFERRED EMBODIMENTS

An embodiment of the present invention is described below with reference to the attached drawings.

A recording-and-reproducing apparatus to which the present invention is applied is a so-called "non-tracking recording-and-reproducing apparatus". The non-tracking recording-and-reproducing apparatus records digital data for inclined recording tracks on a magnetic tape in the recording mode by positioning a recording head to be inclined with respect to the scanning direction of the magnetic tape, and recomposes correctly read data to generate reproduced data by using a reproducing magnetic head to scan the magnetic tape at a speed double that of the relative movement of the magnetic head and the magnetic tape in the recording mode, whereby the need for controlling the reproducing magnetic head to precisely trace the recording tracks is eliminated.

Figure 1:
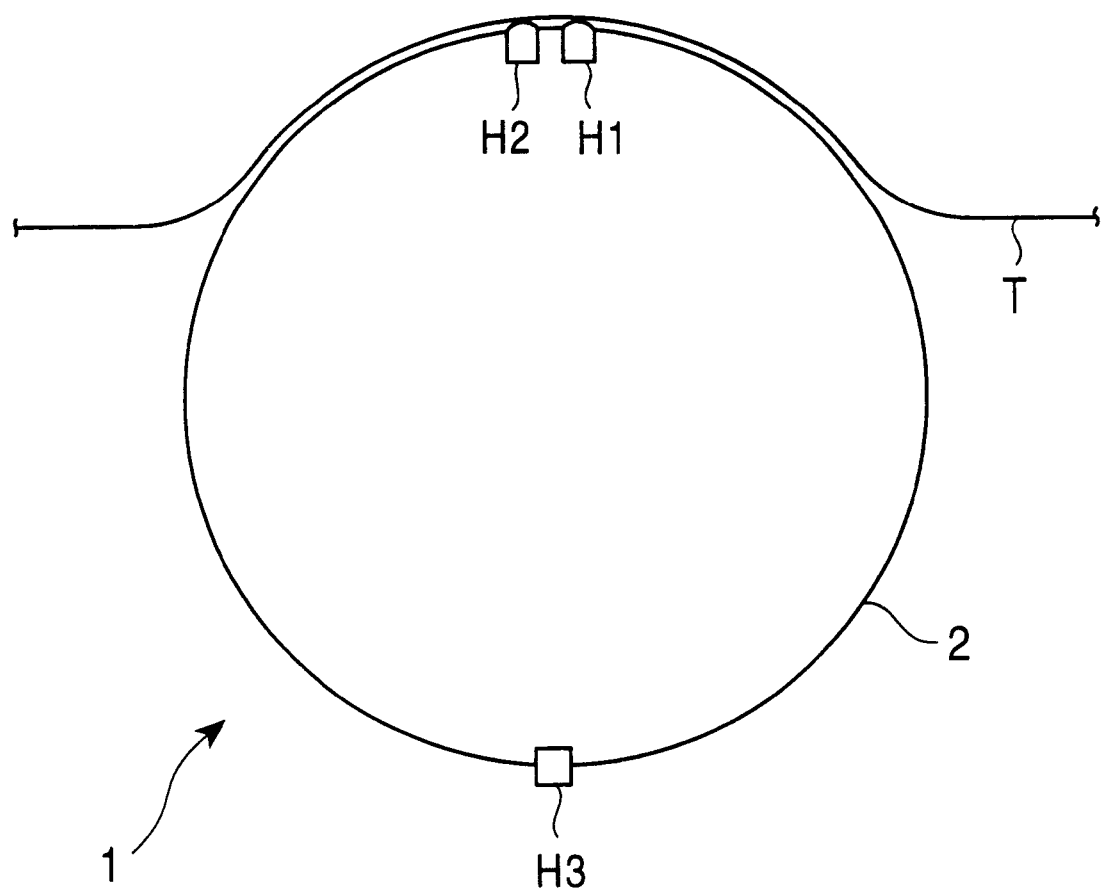
FIG. 1 is a sectional view showing a rotary head unit 1 included in a recording-and-reproducing apparatus according to the present invention.

The recording-and-reproducing apparatus includes a rotary head unit 1 as shown in FIG. 1. The rotary head unit 1 is used to record digital data on a magnetic tape T or to reproduce digital data from the magnetic tape T.

The rotary head unit 1 includes a rotary drum 2, a recording head H1 mounted on the rotary drum 2 so as to direct its magnetic gap from the cylindrical surface of the rotary drum 2 towards the magnetic tape T, a recording-and-reproducing head H2, and a reproducing head H3.

The recording head H1 and the recording-and-reproducing head H2 have different azimuths. The azimuth of the recording head H1 is hereinafter referred to as the "positive azimuth", and the azimuth of the recording-and-reproducing head H2 is hereinafter referred to as the "negative azimuth". The recording head H1 and the recording-and-reproducing head H2 are provided at predetermined positions of the rotary head 2 so as be adjacent to each other.

The reproducing head H3 is provided so as to have a positive azimuth similar to that of the recording head H1. The reproducing head H3 is positioned away from the recording head H1 and the recording-and-reproducing head H2 at a rotational angle of 180° of the rotary drum 2.

The magnetic tape T is wound around the rotary head unit 1 over an angle range of approximately 100°. The rotary head unit 1 is rotated with the magnetic tape T wound around it, whereby the recording head H1 and the recording-and-reproducing head H2 write digital data on the magnetic tape T, and the reproducing head H3 reads the digital data written on the magnetic tape T.

The recording of digital data by the recording-and-reproducing apparatus including the rotary head unit 1 is performed as follows.

Figure 2:
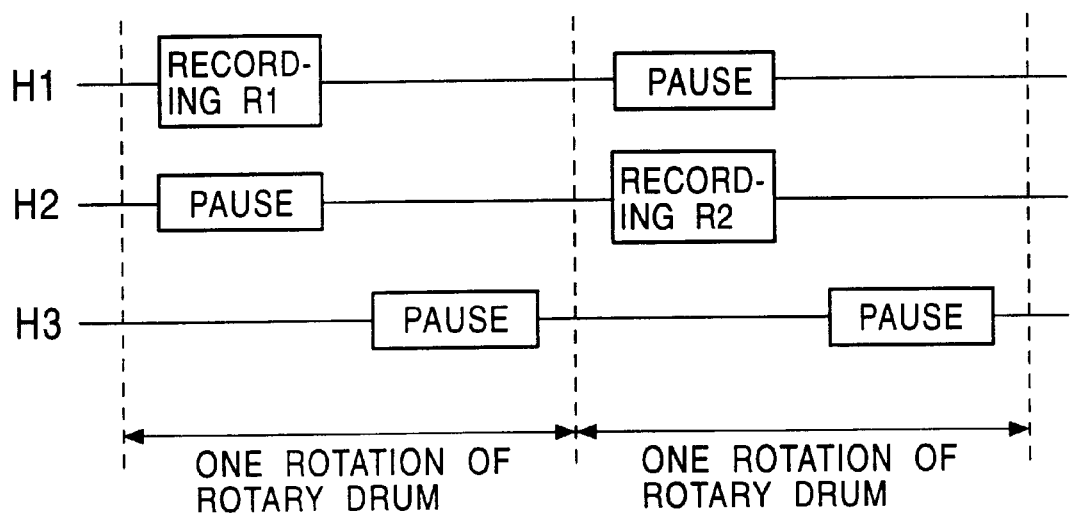
FIG. 2 is a timing chart illustrating the recording of digital data by a recording-and-reproducing apparatus according to the present invention.
Figure 3:
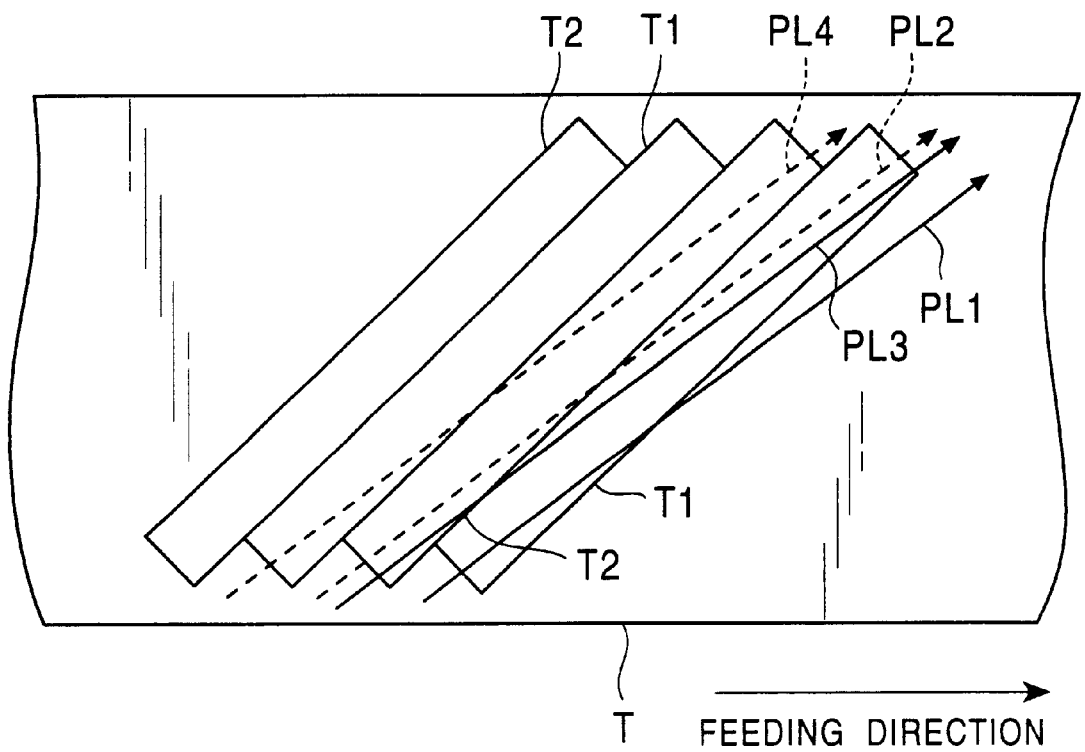
FIG. 3 is a top view showing recording tracks formed on a magnetic tape T and paths on which a magnetic head moves.

First, the magnetic tape T is run at a constant speed. At the same time, the rotary drum 2 is rotated at a predetermined speed. In the period in which the rotary drum 2 makes a first revolution, recording signals are supplied to the recording head H1 so that recording R1 is performed by the recording head H1 as shown in FIG. 2, whereby a recording track T1 is formed to be inclined at a predetermined angle with respect to the feeding direction of the magnetic tape T, as shown in FIG. 3. Digital data are written at a positive azimuth for the recording track T1.

Second, recording signals are supplied to the recording-and-reproducing head H2 in the period in which the rotary drum 2 makes another revolution, and recording R2 is performed by the recording-and-reproducing head H2 as shown in FIG. 2, whereby a recording track T2 adjacent to the recording track T1 is formed on the magnetic tape T, as shown in FIG. 3. Digital data are written at a negative azimuth for the recording track T2.

Subsequently, by alternately supplying the recording signals to the recording head H1 and the recording-and-reproducing head H2 in the above-described manner, the recording tracks T1 and T2 are alternately formed on the magnetic tape T, and the digital data are written.

Figure 4:
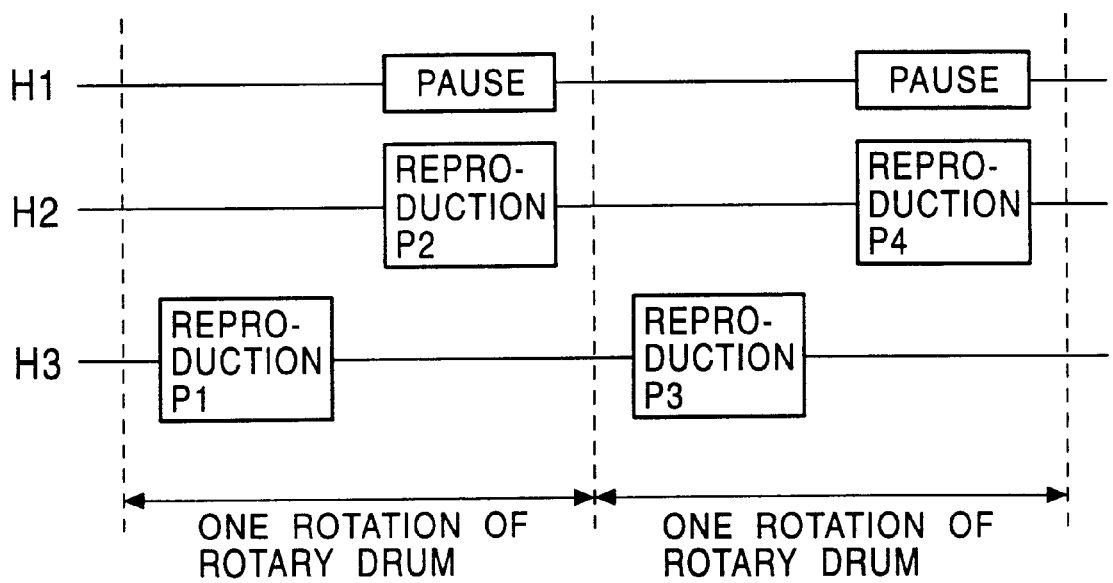
FIG. 4 is a timing chart illustrating reproduction of digital data by a recording-and-reproducing apparatus according to the present invention.

In the case where the recording-and-reproducing apparatus including the rotary head 1 is used to reproduce the digital data recorded on the magnetic tape T, first, the magnetic tape T is run at a constant speed, and the rotary drum 2 is rotated at, for example, the same speed as in the recording mode. In a period in which the rotary head 2 makes a first revolution, reproduction Pl is performed by the reproducing head H3 as shown in FIG. 4. The rotary head 2 rotates from the reproduction P1 by approximately 180° before the recording-and-reproducing head H2 is used to perform reproduction P2. In FIG. 3, a path PL1 is formed such that reproducing head H3 scans a recording track when performing the reproduction P1, and a path PL2 is formed such that the recording-and-reproducing head H2 scans a recording track when performing the reproduction P2.

Second, in the period in which the rotary drum 2 makes another revolution, reproduction P3 is performed by the reproducing head H3 as shown in FIG. 4. The rotary drum 2 rotates from the reproduction P3 by approximately 180° before the recording-and-reproducing head H2 is used to perform reproduction P4. In FIG. 3, a path PL3 is formed such that the reproducing head H3 scans a recording track on the magnetic tape T when performing the reproduction P3, and a path PL4 is formed such that the recording-and-reproducing head H2 scans a recording track when performing the reproduction P4.

Subsequently, by alternately using the reproducing head H3 and the recording-and-reproducing head H2 to scan the magnetic tape T in the above-described manner, the digital data recorded on the magnetic tape T are read.

The recording-and-reproducing apparatus performs the above-described reproduction, whereby the reproducing head H3 reads the digital data recorded at the positive azimuth from the recording track T1, and the recording-and-reproducing head H2 reads the digital data recorded at the negative azimuth from the recording track T2.

The recording-and-reproducing apparatus does not perform tracking control in the reproducing mode. Thus, when the recording-and-reproducing apparatus performs reproduction, the path of the reproducing head H3 may not correspond to the recording track T1, and the path of the recording-and-reproducing head H2 may not correspond to the recording track T2. However, the recording-and-reproducing apparatus can reproduce the digital data recorded on the magnetic tape T because, in the reproducing mode, it performs scanning at a speed double that of the relative movement of each head and the magnet tape T in the recording mode, and obtains reproduced signal by recomposing the digital data for the scans. In the case where the revolution speed of the rotary drum 2 in the reproducing mode is set to be greater than that of the rotary drum 2 in the recording mode, the number of scans of each recording track by the rotary head 2 increases, and the digital data recorded on the magnetic tape T can be reproduced with fidelity.

Figure 5:
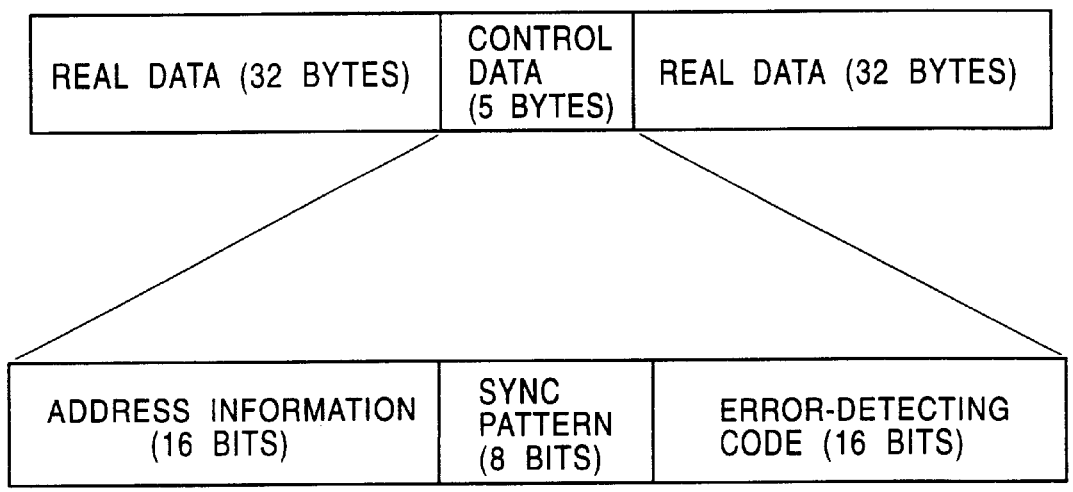
FIG. 5 is an illustration showing data blocks.

In the case where the recording-and-reproducing apparatus records digital data on the magnetic tape T, the digital data to be recorded are separated into units having constant or variable lengths, and control data including at least a synchronizing signal and address information are added to each of the separated digital data units so that data blocks are formed. Each data block is treated as a unit. Dozens to hundreds of data blocks are recorded for each recording track on the magnetic tape T. Each data block consists of, for example, digital data having 69 bytes, as shown in FIG. 5. Among the 69 bytes, 5 bytes are used as control data for managing the data block. 64 bytes excluding the control data are used as digital data (hereinafter referred to as "real data") such as audio data and video data.

The data block has the control data at a position excluding the head and end of the data block, or preferably in the center of the data block. In the data block, the first 32 bytes from the head of the data block are used as real data, next 5 bytes are used as the control data, and the remaining 32 bytes are used as real data.

The control data consists of, for example, 16-bit address information, an 8-bit synchronizing (sync) pattern, and a 16-bit error-detecting code. The sync pattern is used for establishing synchronization of the data block. The error-detecting code is used for detecting errors In the real data.

The digital data, recorded on the magnetic tape T in a form where the digital data are separated into the above-described data blocks, are read using each data block as a unit by the recording-and-reproducing apparatus. From the read data blocks, the head of each data block and the position of each data block in the entire data are recognized based on the control data. Based on the control data, subsequent signal processing is performed.

In the case where the digital data are reproduced by the recording-and-reproducing apparatus, a plurality of data blocks recorded for the recording track T1 is read by using the reproducing head H3 to scan the recording track T1, and a plurality of data blocks recorded for the recording track T2 is read by using the recording-and-reproducing head H2 to scan the recording track T2.

In this reproduction, the recording-and-reproducing apparatus does not perform tracking control. Thus, when the reproducing head H3 scans the recording track T1 by skewing, the error rates of the read data blocks may differ. Similarly, when the recording-and-reproducing head H2 scans the recording track T2 by skewing, the error rates of the read data blocks may differ. Accordingly, the recording-and-reproducing apparatus selects and temporarily stores only data blocks having acceptable error rates, and recomposes the data blocks to generate reproduced data.

Figure 6:
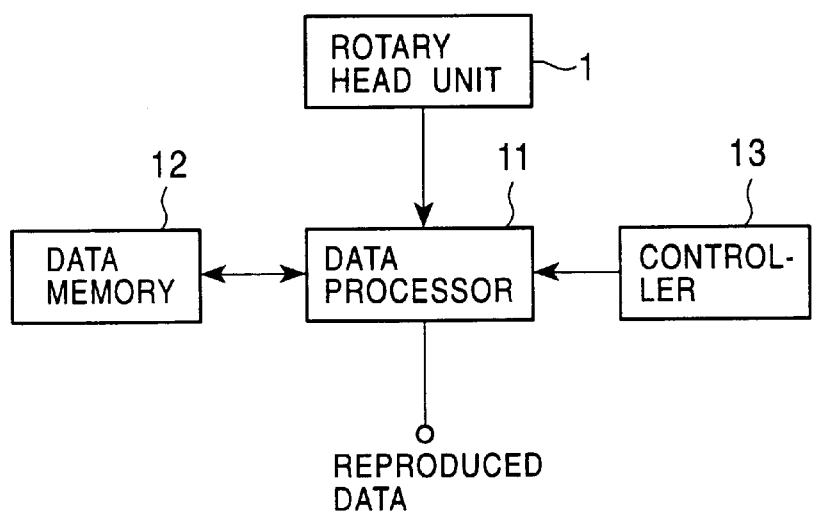
FIG. 6 is a block diagram showing a recording-and-reproducing apparatus according to the present invention.

Specifically, the reproducer of the recording-and-reproducing apparatus includes a data processor 11, data memory 12 connected to the data processor 11, and a controller 13 for controlling the operation of the data processor 11, as shown in FIG. 6.

The data blocks read in initial scanning by the reproducing magnetic head H3 are supplied to the data processor 11, and their error rates are evaluated by the data processor 11. The error rate of each data block is evaluated based on the error rate of the control data of each data block. The controller 13 controls the data processor 11 to temporarily store only data blocks having acceptable error rates in predetermined areas of the data memory 12 based on address information of the data blocks.

Subsequently, the reproducing magnetic head H3 scans the recording track T1 again at a position slightly shifted from the position of the initial scanning. This correctly reads data blocks whose error rates were inferior in the initial scanning, and temporarily stores the data blocks in predetermined areas of the data memory 12 based on address information of the data blocks.

Similarly, the data blocks read in initial scanning by the recording-and-reproducing magnetic head H2 are supplied to the data processor 11, and their error rates are evaluated by the data processor 11. The error rate of each data block is evaluated based on the error rate of the control data of each data block. The controller 13 controls the data processor 11 to temporarily store only data blocks having acceptable error rates in predetermined areas of the data memory 12 based on address information of the data blocks.

Subsequently, the reproducing magnetic head H2 scans the recording track T1 again at a position slightly shifted from the position of the initial scanning. This correctly reads data blocks whose error rates were inferior in the initial scanning, and temporarily stores the data blocks in predetermined areas of the data memory 12 based on address information of the data blocks.

In the recording-and-reproducing apparatus, when a predetermined amount of data blocks is stored in the data memory 12, the controller 13 controls the data processor 11 to read the data blocks, and recomposes the data blocks to generate reproduced data.

According to the recording-and-reproducing apparatus, by temporarily storing only data blocks having acceptable error rates, and recomposing the data blocks to generate reproduced data, digital data recorded on the magnetic tape T are preferably reproduced, even when the path of the reproducing magnetic head H3 or the recording-and-reproducing magnetic head H2 does not correspond to the recording track.

According to a recording-and-reproducing apparatus to which the present invention is not applied, in the case where the path of the reproducing magnetic head H3 or the recording-and-reproducing magnetic head H2 does not correspond to a recording track, data constituting one data block have acceptable error rates and inferior error rates. A single data block has the greatest difference in error rates between the head and end thereof.

In the case where the head or end of the single data block has control data, the error rate of the control data may greatly differ from the error rate of the entire data block because the error rate of each read data block is evaluated based on the error rate of the control data, as described above. Actually, a data block having an acceptable error rate is regarded as a data block having an inferior error rate because the error rate of the control data is inferior. This prevents the data block having an acceptable error rate from being stored in the data memory 12, which may reduces the data utilizing efficiency.

In addition, a data block having an inferior error rate may actually be regarded as a data block having an acceptable error rate because the error rate of the control data is acceptable, and the data block having an inferior error rate is stored in the data memory 12. This may reduce the reliability of reproduced data.

However, by using the recording-and-reproducing apparatus of the present invention to record digital data on the magnetic tape T, each data block is formed such that control data is added to a position excluding the opposite ends of separated data blocks, that is, control data is disposed at a position excluding the head and end of each data block. This prevents the error rate of the control data from greatly differing from the error rate of the entire data block. In particular, when the data block has control data in the center, the error rate of the control data is almost the average of the error rates of data constituting the data block.

Therefore, when the digital data recorded on the magnetic tape T by the recording-and-reproducing apparatus of the present invention are reproduced, their error rates are appropriately evaluated. This increases the data utilizing efficiency, and enhances the reliability of the reproduced data.

Although the present invention is applied to a recording-and-reproducing apparatus in the above-described embodiment, it may be applied to a recording apparatus for recording only, and to a reproducing apparatus for reproduction only.

What is claimed is:

1. A digital data recording method for recording on a magnetic tape digital data formed of a plurality of data blocks in each of a plurality of recording tracks for subsequent non-tracking reproduction, the method comprising the steps of:
   forming said data block with a known length and with control data including a synchronizing signal and address information; and
   recording said control data in said data block at a position excluding opposite ends of said data block.

2. A recording apparatus comprising:
   a data writer for recording digital data for subsequent non-tracking reproduction by using a recording head on a magnetic tape which is moved with respect to said recording head; and
   a data supplier for supplying said data writer with said digital data as a plurality of data blocks in each of a plurality of recording tracks, said data block separated into units having known lengths,
   wherein said data block includes control data including a synchronizing signal and address information, and said control data is recorded in said data block at a position excluding opposite ends of said data block.

3. A reproducing apparatus comprising:
   a data reader for causing a reproducing magnetic head to scan a magnetic tape in a non-tracking operation, so that digital data recorded on said magnetic tape are read; and
   a signal processor for generating reproduced data by implementing signal processing on the digital data read by said data reader,
   wherein said digital data read by said data reader were recorded on said magnetic tape as a plurality of data blocks in each recording track of a plurality of recording tracks on said magnetic tape, said data block separated into units having known lengths,
   said data block includes control data including a synchronizing signal and address information, and said control data is recorded in said data block at a position excluding opposite ends of said data block.

4. The reproducing apparatus according to claim 3, wherein said signal processor generates said reproduced data by temporarily storing the digital data read by said data reader and recomposing the digital data based on said address information of each data block.

5. A magnetic tape on which digital data as a plurality of data blocks in each of a plurality of recording tracks, said data block separated into units having known lengths are recorded for subsequent non-tracking reproduction in recording tracks inclined with respect to a direction of tape movement, wherein said plurality of data blocks each include control data including a synchronizing signal and address information, and said control data is recorded only at a position excluding opposite ends of said data block.

* * * * *